United States Patent [19]

Sie et al.

[11] 4,383,468
[45] May 17, 1983

[54] METHOD OF PRODUCING FRAGMENTABLE CASINGS AND PRODUCT OBTAINED

[75] Inventors: Swan L. Sie, Zaandam, Netherlands; Lars Ringdal, Zug, Switzerland

[73] Assignees: Eurometaal N.V., Zaandam, Netherlands; Sinterplast Etabl., Vaduz, Liechtenstein

[21] Appl. No.: 96,754

[22] Filed: Nov. 23, 1979

[30] Foreign Application Priority Data

Dec. 22, 1978 [CH] Switzerland .................. 13081/78

[51] Int. Cl.$^3$ ............... F42B 13/18; F42B 13/48
[52] U.S. Cl. ................... 86/1 R; 86/20 B; 102/496; 264/122; 264/310; 29/1.2
[58] Field of Search ........... 102/482, 491, 494, 495, 102/496; 264/126, 122, 310; 86/1 R, 20 R, 20 B; 29/1.2–1.23; 75/201, 211, 214, 226

[56] References Cited

U.S. PATENT DOCUMENTS

| | | |
|---|---|---|
| 2,659,107 | 11/1953 | Bell ............................... 86/1 R |
| 3,718,091 | 2/1973 | Theate ........................... 102/496 |
| 3,882,779 | 5/1975 | Frostig .......................... 102/496 |
| 3,891,597 | 6/1975 | Needham et al. ............ 260/42.21 |
| 4,104,357 | 8/1978 | Blair ............................. 264/310 |

*Primary Examiner*—Harold J. Tudor
*Attorney, Agent, or Firm*—Michael Klotz

[57] ABSTRACT

A method of producing plastic-based casings including preformed metal fragments for ordnance articles, such as hand grenades, weapon-launched grenades or the like, by rotational molding in a shell-mold; a pulverulent thermoplastic polymer material, such as polyethylene, and steel fragments or particles are introduced into the cold shell mold, optionally in the form of a pre-compact; the closed mold is rotated slowly, i.e. at a speed where the polymer and metal constituents tend to tumble about the inner mold surface and are not held substantially thereon by centrifugal effects; while continuously rotating the shell mold about two or more axes of rotation, the mold is heated by an externally applied hot fluid such as hot gas. As the temperature of the wall of the mold increases, an adhering layer of viscous polymer is formed thereon while the metal fragments continue to tumble; only when most of the polymer material is in a viscous molten state and has formed a layer covering the inner surface of the mold, the metal particles will adhere to the viscous material layer and form a metal particle monolayer thereon; then, the mold is cooled while still in rotation until the polymer solidifies. Finally, the molded product is discharged from the shell and provides an integral casing substantially consisting of an outer wall of polymer material and a monolayer of metal fragments adhering thereto. Molecular cross-linking of the polymer may be effected by a cross-linking agent and activating the latter after formation of the monolayer.

15 Claims, 5 Drawing Figures

METHOD OF PRODUCING FRAGMENTABLE CASINGS AND PRODUCT OBTAINED

BACKGROUND OF THE INVENTION

1. Field of the Invention

The present invention generally relates to military or ordnance articles and specifically to the production of fragmentation casings for hand grenades, weapon-launched grenades and other explosive ordnance articles of the type having a charge that is enclosed by a casing member and a delay or contact fuse for initiating the charge.

2. Description of the Prior Art

Various ordnance articles of the above mentioned type are known, e.g. grenades or mines for launching (by hand or by a weapon) or for installation in the soil and the like. The common feature of such articles, insofar as the invention is concerned, is a fragmentation casing, that is, a shell, wall or the like member intended to produce a fragmentation effect substantially due to preformed fragments, i.e. fragments formed into their final shape before detonation of the explosive charge.

In conventional hand grenades, for example, a steel casing made for instance by casting is furnished with an array of notches that more or less define the shapes of fragments of the casing resulting from disntegration thereof upon explosion of the charge. Such all-metal casings are quite heavy in relation to the number of fragments resulting from explosive disintegration; to reduce the weight of such casings and so simplify production thereof it is known in the art to form a composite casing on the basis of synthetic polymer compositions with preformed metal fragments embedded therein.

Typical hand grenade casings of this type are disclosed, for example, in U.S. Pat. No. 2,762,303, in French Pat. Nos. 1,237,195 and 2,142,270, in German patent application No. 1,164,883 and in Swiss Pat. Nos. 388,141 and 405,113.

For producing such casings various synthetic polymers or plastics constituents, both of the thermoplastic and duroplastic (thermosetting) type, have been suggested in the art together with various methods of shaping the casings, e.g. by casting, injection molding or press molding. For example, one prior art method provides for first forming two shells from polystyrene with metal particles embedded therein and adhesively combining such shells and finally surrounding the casing component obtained with a jacket of polyethylene by injection molding.

In practice, however, such prior art methods have not proved satisfactory, either because the metal fragments embedded in the plastics casing and penetrating through the casing result in an uncontrolled weakening of the material and/or because the proposed methods can only be carried out at considerable expense, if at all. Thus, for example, the method suggested in the above mentioned Swiss Pat. Nos. 388,141 and 405,113 provides for embedding the metal fragments in a shell of a first plastics material and subsequent injection molding of a second plastics material around this shell. However, the fragment-embedding shell must be relatively thick for subsequently encasing it by injection molding with a second casing so that the cavity volume becomes either too small or the casing too heavy. Furthermore, the method requires many manufacturing steps as well as expensive molds and equipment.

Accordingly, it is a main object of the invention to provide for a novel structure of a fragmentation casing in whichthe preformed metal fragments do not substantially weaken the plastics-based wall member of the casing.

A further object is a fragmentation casing which is an integral or monolithic structure having an outer layer of an organic polymer composition and an inner layer formed of metal fragments.

Yet another object of the invention is an improved method of making fragmentation casings by molding both the plastics-based wall member of the casing and the casing constituent that holds the preformed fragments in a single molding step.

Further objects will become apparent as the specification proceeds.

SUMMARY OF THE INVENTION

It has been found, according to the invention, that the above objects and further advantages are achieved by rotational molding of the casing constituents, or the polymer precursors thereof, including preformed metal fragments in a shell mold at operating conditions that lead to formation of a substantially continuous layer including most of the organic polymer constituent prior to connection of the polymer layer with the preformed metal fragments, and to subsequent adhesive connection of the metal fragments to the polymer layer. Generally, such operating conditions include rotation of the shell mold or mold cavity about at least two axes of rotation at relatively slow rotational speeds, i.e. where there is little or no centrifugal adherence of the shell mold charge on the molding surface.

While not wishing to be bound by a particular theory, it is believed that the particulate polymer component, prior to complete melting thereof, is capable of acting as a temporary separating or release agent preventing precocious adherence of the metal fragments to the melting or coalescing polymer layer formed within the mold cavity.

According to a generally preferred embodiment of the invention the method comprises the steps of (A) introducing a predetermined quantity of a normally solid polymer composition in the form of fine particles capable of coalescing and melting at an elevated temperature, i.e. at least about 100° C., and a predetermined quantity of preformed metal fragments into a cold shell mold, i.e. having a temperature below 100° C., e.g. at normal ambient temperature (10°-30° C.) or higher; the shell mold is provided with a thermally conducting mold wall and has an interior surface shaped to substantially correspond with the outer shape of the casing to be produced; the predetermined quantity of said polymer composition is such as to be sufficient to form a continuous layer, e.g. having a thickness in the range of from 1 to 10 mm, of said polymer composition in a molten form on the interior or molding surface of the mold wall; the predetermined quantity of said metal fragments is sufficient to form a layer, preferably a monolayer, of metal fragments on the continuous layer of the polymer composition; the metal fragments have a mean particle size that is at least twice as large as the mean particle size of the fine particles of the polymer composition;

(B) closing the shell mold and slowly rotating the closed mold about at least two different axes of rotation;

(C) heating the revolving shell mold with a heated fluid, e.g. hot gas, tht contacts the outer shell mold wall and has a temperature above that temperature which causes melting of the polymer composition;

(D) continuing said heating of said revolving shell mold until a coherent and substantially uniform layer of said melted polymer composition has formed on said interior shell mold surface, said layer being covered on its inner surface with a layer of metal fragments adhering thereto;

(E) cooling said revolving shell mold, and (F) discharging the casing formed in said mold.

According to another preferred embodiment, the invention provides for a fragmentation casing suitable for an explosive ordnance or military article of the type having a charge substantially enclosed by a casing member for explosive disintegration thereof upon ignition of said charge, such as a hand grenade, weapon-launched grenade and the like; the casing is an integral structure of an outer layer of an organic polymer composition and an inner layer formed substantially of a plurality of metal fragments in a substantially stratiform array of said fragments connected with said outer layer at the interior surface thereof.

DESCRIPTION OF PREFERRED EMBODIMENTS

The normally (i.e. at ambient conditions) solid particulate (i.e. consisting of particles) polymer composition for use in step (A) of the inventive method must be in the form of fine particles, i.e. having particle sizes of not more than about 1 mm, and must be capable of coalescing and melting at temperatures of at least about 100° C., e.g. in the range of from 100° to 250° C., and preferably above 100° C.

The terms "particulate polymer composition" and "polymer powder" are used interchangeably herein and refer to the above mentioned particulate polymer compositions regardless of the specific type of polymer (homopolymers, copolymers and mixtures thereof) and regardless of non-polymeric constituents, such as stabilizers, catalysts, fillers, etc., except the metal fragments.

Particulate polymer compositions having the required particle size and coalescing or melting properties are known and available, in general, as commercial products, e.g. for general plastics molding purposes and may contain coloring and/or filler materials, cross-linking catalysts and other additives. Particulate polymer compositions having maximum particle sizes of less than 1 mm, preferably 0.5 mm or less, are preferred. Examples are polymer compositions on the basis of polyalkanes, for example polyethylene, and especially preferred for many purposes of the invention are polyalkanes which can be cross-linked catalytically (for example with peroxy compounds, such as peroxy acids, peroxides, etc.) at elevated temperatures, e.g. of from about 160° to 250° C., or by other methods known per se, i.e. irradiation. The cross-linking polymer materials described in U.S. Pat. No. 3,891,597, in Canadian Pat. No. 912,726 and in British Pat. No. 1,295,354 are given as examples.

Metal fragments (i.e. the metal particles of the inventive fragmentation casing) generally made of steel and having relatively uniform shapes and particle diameters (minimum diameter) of above about 1 mm, e.g. from 1.5 to 4 mm, are preferred but even larger fragments, e.g. having particle diameters of up to 10 mm or more, can be used, depending upon the thickness of the casing as explained below. The term "uniform" shape referring to the metal fragments is intended to express the fact that height, length and width of a fragment are approximately equal, such as is the case, for instance, in approximately cubic or generally polyhedral (regular or irregular multi-surface), cylindrical, spheroidal or spherical fragments. Fragments having such a substantially regular shape are hereinafter referred to as "approximately spherical."

The quantity of metal fragments for charging a given mold is selected such that these fragments can form, on the inner surface of the layer of polymer material formed by melting of the polymer particles, a virtually uniform, densely packed layer of metal fragments—subsequently called monolayer; the thickness of this monolayer is preferably equal to approximately the diameter of the substantially equal-sized fragments and preferably not thicker than about twice the diameter of the metal fragments.

Polymer powder and metal fragments can be introduced separately or as a mixture into the cold mold. An important aspect of the inventive method is that both components are present in the mold when the latter is rotated and heated as described below.

A preferred form of a mold charge in the form of a mixture of polymer powder and metal fragments is a compact containing the metal fragments approximately at the center of the compact while the polymer powder is mechanically compacted to surround and temporarily hold the fragments. The advantage of using such a compact is that it can be warmed up before being introduced into the mold to a temperature below the melting temperature so that subsequent molding can be accelerated and the cycle time (charging—molding—discharging) can be shortened.

According to a preferred embodiment of the invention, fragmentation casings for hand grenades, e.g. in the form of an ovoid or sphere, are produced; such casing has at least one opening intended for insertion of a fuse and the diameter of the opening is smaller than the maximum inner diameter of the casing. The preferred inventive casing has an interior volume or a cavity sufficient for receiving an adequate volume of a conventional high-explosive charge plus fuse which can be a delayed-action type or contact-type fuse of the type known per se. When the casing plus explosive charge plus fuse is detonated, the casing will be disintegrated and the fragments will be accelerated to act as projectiles in a manner known per se, e.g. from U.S. Pat. No. 2,762,303.

For producing such a preferred type of casing according to the invention, a shell mold consisting of at least two mold parts will be used so that the casing formed can be discharged upon separation of the mold parts without problems. Of course, conventional mold-release agents can be used if desired.

A preferred shell mold for use in the inventive method will be described in more detail below; briefly, it comprises two mold parts and a threaded pin. The components (polymer powder and metal fragments) can be introduced into the mold either separately or as non-compressed mixture through the threaded mold opening that can be sealed by the threaded pin. When using a mixture of the components in the form of a compact as mentioned above, such compact will usually be placed into the mold prior to assembling the mold parts.

It has been found according to the invention that the mean particle size of the metal fragments should in general be at least twice as large as the mean particle size of the polymer powder. Upon subsequent heating of the revolving shell mold above the melting temperature of the polymer composition it will be observed that a substantially uniform and homogeneous layer of polymer material is formed practically without inclusions of metal fragments therein. Only when most of the polymer material is incorporated into the coherent polymer layer, the metal fragments adhere to the inner surface of the previously formed polymer layer and form a metal fragment layer thereon.

In other words, and in contrast with the teachings of U.S. Pat. No. 2,762,303, the polymer layer of an inventive casing is not a matrix for the fragments but an outer "mantle" (surrounding layer) for a monolayer of fragments adhering to the inner surface of the polymer mantle.

It is believed that this surprising result is caused by a temporary releasing effect of the particles of the polymer composition on the metal fragments: all particles which bear against the moving and externally heated shell mold are indeed heated up, but when the coalescence or melting temperature of the polymer composition is exceeded, a layer of the polymer material adhering to the inner surface of the mold will be formed first; this sticky layer is continually covered by polymer particles adhering to it but not yet melted. The not yet melted polymer particles are apparently held in preference to the metal fragments by the melted polymer particles so that the metal fragments are not bonded to the molten polymer material as long as there is still a sufficient amount of solid polymer particles availale to cover the melted polymer mass that adheres to the mold surface.

Generally, an important factor for the method of this invention is a sufficiently slow rate of rotation of the mold during heating. By contrast to known rotational molding methods, the components (polymer particles and metal fragments) present in the mold should not be held against the wall of the mold by centrifugal forces when operating the inventive method. Such centrifugal force would have the undesired effect that the metal fragments bearing against the mold wall would be pressed into the molten polymer material and become bonded near or at the outer surface of the finished casing; such a casing structure is conventional and has the above-explained disadvantages; in contrast, the structure of the inventive casing comprises an external and substantially compact polymer layer and an internal metal fragment layer substantially without embedding of the metal fragments in the polymer material.

Accordingly, "slow rotation" of the mold is intended here to refer to rotational speeds or rates that do not result in significant centrifugal and centripetal effects—i.e. no centrifugal adherence of the metal fragments—for example rotation rates in the range of from about 1 to about 50 revolutions per minute.

To achieve a substantially uniform thickness of the polymer layer, the mold is generally rotated in a tumbling manner, that is, about at least two different rotational axes, for example about the vertical axis and one horizontal axis of the mold. The rates of rotation about the different mold axes may be the same or different, but must both be "slow" in the sense explained above.

The tumbling rotating shell mold is heated externally by a fluid, for example hot air, to temperatures which lead to coalescing and melting of the polymer particles and, if desired, also to thermal cross-linking (activation of cross-linking catalyst). For polymers of the type mentioned above, temperatures in the range of from about 120°–160° C. will cause melting and those from about 160°–250° C. will cause cross-linking.

The use of catalytically cross-linking polyalkanes or polyalkylenes is preferred, the term "catalytically" preferably implying cross-linking triggered by radicals, e.g. as formed upon decomposition of a peroxy compound. An advantage of cross-linking of the polymer resides in an increased thermal and mechanical strength of the casings of the invention; another advantage of cross-linking is that the increasing heat transfer from the fluid into and through the mold wall does not lead to an overly fluid melt as cross-linking tends to increase viscosity. By a cross-linking that proceeds gradually as the temperature rises, the polymer layer can be kept sufficiently viscous for achieving and maintaining uniform layer thickness even at very low rates of rotation.

Heating of the tumblingly revolving mold can be discontinued as soon as the polymer layer with adhering monolayer of metal fragments has been formed and possibly after some or all cross-linking of the polymer, for example 15 to 30 minutes after commencement of heating. After cooling down, the casing can be removed from the mold upon disassembling the mold parts.

Devices for tumbling movement and heating of shell molds are known per se, e.g. from U.S. Pat. Nos. 2,659,107 and 3,676,037, Swiss Pat. No. 296,748 and British Pat. Nos. 766,828, 1,314,815, 1,352,701 and 1,352,702; such devices can be used for the method of this invention provided that modifications required in view of the above explanations are allowed for, notably with regard to the rate of rotation.

Casings according to the invention are suitable for producing explosive ordnance articles, such as hand grenades, weapon-launched grenades, land-mines, launchable mines and other types of ammunition where a fragmentation effect of the war-head casing is required. Generally, for such use the cavity of the inventive fragmentation casing is provided with an explosive charge and a detonator or fuse.

While the invention is described below primarily in its use for hand grenades or weapon-launched grenades, fragmentation casings made according to the invention can be used also for other types of ammunition and weapons, including artillery or rocket ammunition and the like.

BRIEF DESCRIPTION OF THE DRAWINGS

The invention will be better understood and objects other than those set forth above will become apparent when considering the following detailed description thereof. Such description makes reference to the annexed drawings, wherein:

FIG. 1 shows a horizontal sectional view of a fragmentation casing 10 for a hand grenade made according to the invention. Casing 10 consists of a substantially homogeneous mantle or outer layer 11 of polymer material and a layer 14 adhering to layer 11 of substantially uniformly and densely distributed granular metal fragments 12 having substantially equal sizes and shapes. Casing 10 is furnished at its upper end with a thread 18 for screwing in a fuse or detonator. The thickness or gauge of mantle-layer 11 is at least as large as the mean diameter of the metal fragments 12. The thickness of layer 14 is about the same as, or somewhat greater than, the mean diameter of the metal fragments 12.

FIG. 2 shows a simplified sectional view of a shell mold 20 suitable for producing casing 10 of FIG. 1. The inner surface 29 of mold 20 corresponds substantially to the outer form or shape of casing 10. Mold 20 consists of two mold parts 201, 202 held together by conventional means (not shown), such as thread arrangements, clamping devices or the like. The upper end of upper mold part 202 is closed with a screw-in threaded plug 27 which also functions as a core means for forming thread 18 of casing 10. Preferably, mold 20 is formed of a thermally conducting material, such as a metal, e.g. steel.

Figure 1:
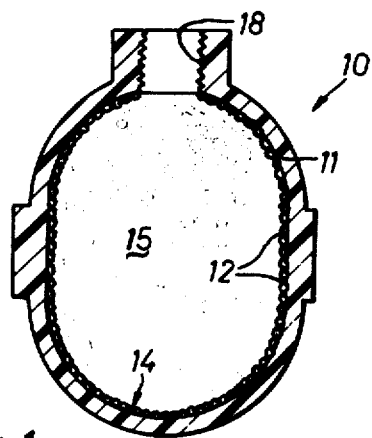
FIG. 1 is a semidiagrammatic vertical sectional view of a fragmentation casing according to the invention for a hand grenade.
Figure 2:
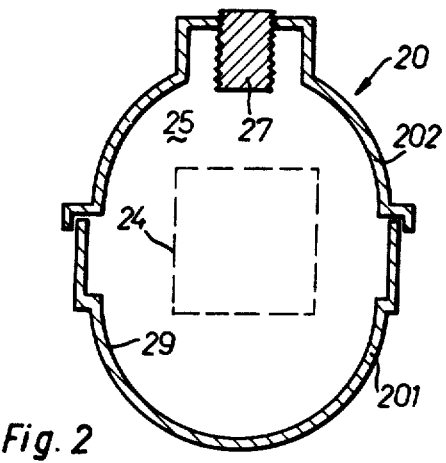
FIG. 2 is a semidiagrammatic vertical sectional view of a shell mold for producing the casing of FIG. 1 according to the inventive method.
Figure 3:
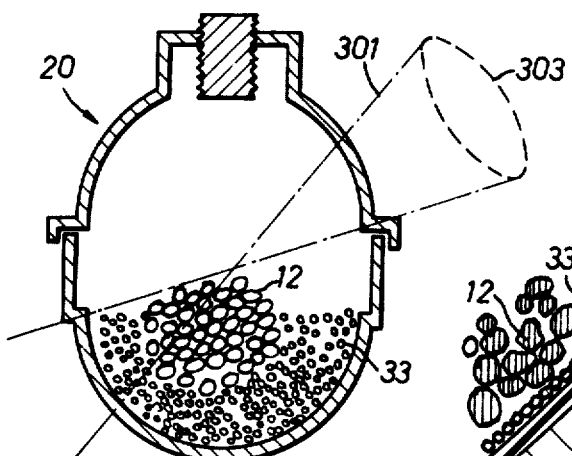
FIG. 3 shows the shell mold of FIG. 2 after charging with polymer particles and metal fragments.

For producing a casing 10 of FIG. 1 mold 20 can be filled with polymer powder 33 and metal fragments 12 and then closed with plug 27 as shown in FIG. 3. Alternatively, a previously prepared mixture in the form of a powder compact having a core portion of metal fragments can be placed into opened mold 20. Such compact 24 is indicated diagrammatically in broken lines in FIG. 2 but need not have the cubic shape indicated.

Mold 20 is now set in tumbling motion by an external device (not shown), for example by rotating mold 20 about axis 301 (primary movement) and continually changing the position of axis 301 (secondary movement), for example by moving rotational axis 301 additionally around a circular path 303. The position of rotational axis 301 and its movement can, of course, be varied as desired, for example by rotational axis 301 in the longitudinal axis of mold 20 and being rotated continuously in a radial plane. The essential conditions of a tumbling mold movement have been mentioned above and devices for mold tumbling are disclosed in the Patents mentioned above.

Figure 4:
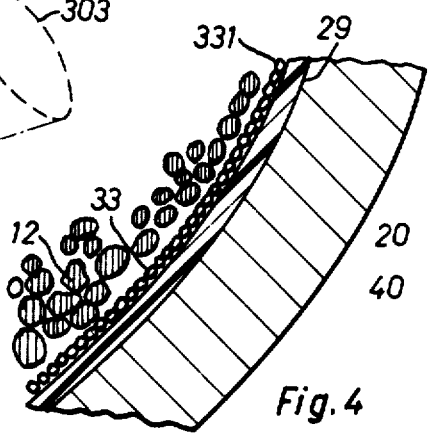
FIG. 4 is a semidiagrammatic sectional view of an enlarged broken-away portion of a mold wall during coalescence of polymer particles and before formation of a layer of metal fragments.

Tumbling mold 20 is then heated to a temperature which is sufficient for coalescence of adjacent polymer particles to molding surface 29 of mold 20. Depending upon the type of polymer, this temperature lies in the range of from about 120° to about 280° C., preferably in the range of from 150° to 250° C. FIG. 4 semidiagrammatically shows a cut-away portion 40 of mold wall 20 including the molding surface 29; as a consequence (a) of heating up mold 20 to coalescence temperatures and (b) of tumbling mold motion, a layer 331 is formed from polymer particles 33 upon particle coalescence on surface 29; the inner surface of layer 331 is tacky and will be coated continuously with further particles 33 which, in turn, will coalesce and intermelt with layer 331.

The metal fragments 12, on the other hand, will, at that stage, not adhere to layer 331, apparently because of the covering layer of adhering particles 33. Once the inner surface of tacky layer 331 is not covered by unmolten polymer particles 33 any longer and upon continued mold tumbling, metal fragments 12 will start to adhere to layer 331 and form what can be said to constitute a "monolayer" thereon, i.e. when a single layer of mutually contacting fragments 12 is adhesively connected with the inner surface of polymer layer 331. Apparently, both the gradually increasing mold temperature and the different densities of the polymer, one the one hand, and the metal fragments on the other hand tend to contribute to formation of the inventive casing structure.

When the monolayer of fragments has formed, e.g. as evidenced by acoustic signals, any further heating of the mold should not substantially reduce the viscosity of layer 331. Such further heating may serve to cross-link the polymer but should be terminated as soon as a substantial viscosity reduction might follow.

Figure 5:
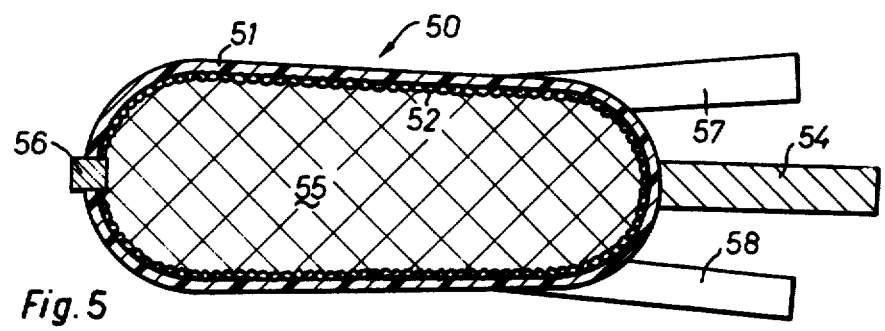
FIG. 5 is a semidiagrammatic vertical view of a weapon-launched grenade having a fragmentation casing according to the invention.

FIG. 5 is a semidiagrammatic sectional view of a weapon-launched grenade 50 having a fragmentation casing 51 according to the invention with an inner layer 52 formed of adherent metal fragments. Fuse 56 which may be a timer fuse or an impact fuse serves to initiate charge 55 made of a high explosive. A conventional adapter 54 fitting into a barrel bore (not shown) as well as guide vanes 57, 58 are provided on grenade 50 in a manner known per se.

Specific examples embodying the inventive method are set forth below. These examples are illustrative only and are not to be understood as limiting the scope and underlying principles of the invention in any way. All percentages are by weight.

The method of this invention will now be explained by the following examples.

EXAMPLE 1

Fragmentation casings for hand grenades of the general shape and structure of FIG. 1 were produced in a segmented steel mold 20 of the type shown in FIG. 2. Mold parts 201, 202 were pressed together with a clamp. After plug 27 had been unscrewed and removed, 35 g of a pulverulent polyethylene (PE) composition capable of cross-linking and having particle sizes of about 500 μm, and 125 g of steel fragments (approx. 2100–3000 particles) were poured into mold 20 at room temperature (10° to 30° C.). The PE composition was a bulk-dyed commercial product sold by Philips Petroleum Company under the trade mark "Marlex," type CL 100/35, containing, according to the information of the manufacturer, a peroxy-based cross-linking agent in an amount ranging from about 0.5 to about 5%. The steel fragments were obtained by cutting up wire having a gauge of about 2.2 mm to form pieces thereof, each having a length of about 2.2 mm with subsequent round-hammering of the wire pieces and hardening of the hammered particles.

Assembled mold 20 filled with polyethylene powder and steel fragments was closed by threaded plug 27, mounted in a conventional tumbling frame and placed in a hot air oven. The drive of the tumbling frame was set for a mold rotation rate of 3.3 to 3.6 rev/min about its vertical axis and for a simultaneous mold rotation rate of 10 to 12 rev/min about its horizontal axis; mold 20 was then heated externally with hot air having a temperature of from 260° to 270° C.

After 30 minutes under these conditions heating was terminated while rotation continued. After the mold had cooled down to below about 50° C. rotation was discontinued; the mold halves were separated by releasing the clamp, and pin 27 was unscrewed.

The fragmentation grenade casing obtained was supplied with a charge of high explosive and closed by threading in a conventional time fuse device. Upon detonation the casing disintegrated and formed a multiplicity of high-speed fragmentation projectiles by the steel fragments.

For testing purposes, another casing obtained in accordance with this example was cut through in a vertical plane for investigation and exhibited a structure substantially as shown in FIG. 1 of the drawings. The thickness of layer 11 was about 3 mm and the fragments 12 were distributed in an approximately uniform monolayer 14 on the inner surface of layer 11 and adhered strongly to the latter.

The polyethylene of layer 11 had a density of 0.93 and a tensile strength (determined according go ASTM Standards at 2" per min) of 2600 tons per square inch. Testing of the polyethylene of layer 11 indicated a cross-linking degree of 93%, as evidenced by a boiling test in toluene, and was sufficiently resistant to extreme ambient conditions, i.e. stability of form at elevated temperatures and no embrittlement at low temperatures in the testing temperature range for explosive ordnance articles.

EXAMPLE 2

Fragmentation casings were produced as described in Example 1. For controlling the formation of the casings, various samples were produced, but the samples produced were removed from the mold after 5, 10, 15, 20 and 25 minutes, respectively.

The results obtained by cutting through the specimens indicated that first a polyethylene coating without adhering metal particles forms on the inner surface of the mold and that the thickness of the polyethylene layer increases until the entire polyethylene powder is melted; this occurs substantially without any embedding of the metal fragments into the polymer layer.

Only when a predominant portion of the polyethylene powder has melted to form the layer, bonding occurs between the polyethylene layer and the metal fragments until all the metal fragments are cemented to the inner surface of the polyethylene layer. This takes place at mold temperatures in the range of from 130° to 160° C. and is then practically completed, approximately within 15 to 20 minutes. During the last 10 to 15 minute period in the oven, the formed layer structure does not change in a significant manner and at mold temperatures in the range above about 160° C. cross-linking of the polyethylene by activation of the peroxy catalyst proceeds with the result that the viscosity of the polymer mass is maintained or even increases even though the mold temperature increases, e.g. up to the maximum temperature of the oven.

Suitable modifications could be made to the specific embodiments and examples described herein above without departing from the inventive concept of a plastics casing with adhering inner layer of metal fragments. For example, other polymers except polyethylene can be used, e.g. polymers selected from thermoplastic and thermosetting species, e.g. polypropylene, polyamides, polyacetals, polycarbonates, polyesters, polyethers, aldehyde/phenolic condensates, melamine resins, urea resins, and the like polymers suitable of meeting the strength and processing requirements set forth above, and other metals and shapes could be used for the fragments. Further, the casing shape, the mold and the molding method can be varied as long as the above mentioned general criteria are met.

So, while certain preferred embodiments of the invention have been explained in some detail for illustration, it is to be understood that the invention is not limited thereto but may be otherwise embodied and practiced within the scope of the following claims.

Accordingly, what is claimed is:

1. A method of producing a fragmentation casing for an explosive ordnance article of the type having a charge substantially enclosed by a casing member for explosive disintegration thereof upon ignition of said charge, said casing having an integral structure combining a wall formed of an organic polymer composition and a plurality of preformed metal fragments, said method comprising the steps of:
    (A) introducing a predetermined quantity of a normally solid polymer composition in the form of fine particles capable of coalescing and melting at an elevated temperature, and a predetermined quantity of said preformed metal fragments into a cold shell mold provided with a thermally conducting shell mold wall and having an interior surface shaped to substantially correspond with the outer shape of said casing; said predetermined quantity of said polymer composition being sufficient to form a continuous layer of said polymer composition in a molten form on said interior surface of said shell mold wall and said predetermined quantity of said metal fragments being sufficient to form a layer of said metal fragments on said continuous layer of said polymer composition; and said metal fragments having a mean particle size that is at least twice as large as the mean particle size of said fine particles of said polymer composition;
    (B) closing said shell mold containing said fine particles of said polymer composition and said metal fragments and slowly rotating said closed shell mold about at least two different axes of rotation;
    (C) externally heating said closed and revolving shell mold with a heated fluid having a temperature above that temperature which causes melting of said polymer composition;
    (D) continuing said heating of said revolving shell mold until a coherent and substantially uniform layer of said melted polymer composition has formed on said interior shell mold surface, said layer being covered on its inner surface with a layer of metal fragments adhering thereto;
    (E) cooling said revolving shell mold, and
    (F) discharging the casing formed in said mold.

2. The method of claim 1, wherein said polymer composition is capable of molecular cross-linking and wherein said layer formed in step (D) is subjected to cross-linking conditions.

3. The method of claim 2, wherein said polymer composition contains a cross-linking agent capable of controlled thermal activation, and wherein said polymer layer formed in step (D) is at least partially cross-linked by heating for thermal activation of said cross-linking agent prior to step (E).

4. The method of claim 1, wherein said polymer composition consists, at least in part, of a polyalkylene.

5. The method of claim 1, wherein said metal fragments have substantially granular shapes.

6. The method of claim 1, wherein said particles of said polymer composition have approximately spherical shapes and maximum particle dimensions of below about 1 mm.

7. The method of claim 1, wherein said metal fragments have a mean particle size in the range of from about 1 to about 5 mm.

8. The method of claim 1, wherein said coherent layer of said melted polymer composition formed in step (D) has a thickness that is at least as large as said mean particle size of said metal fragments.

9. The method of claim 8, wherein said coherent layer formed in step (D) has a thickness that is not more than twice as large as said mean diameter of said metal fragments.

10. The method of claim 3, wherein said cross-linking is effected by heating to a temperature and for a period sufficient to activate said cross-linking agent.

11. The method of claim 4, wherein said polymer composition consists, at least in part, of a catalytically cross-linkable polyalkylene.

12. The method of claim 11, wherein said polymer composition consists, at least in part, of a catalytically cross-linkable polyethylene.

13. The method of claim 5, wherein said metal fragments are made of steel.

14. The method of claim 6, wherein said particles of said polymer composition have maximum particle dimensions of not more than 500 μm.

15. The method of claim 7, wherein said metal fragments have a mean particle size in the range of from about 2 to about 3 mm.

* * * * *